(12) United States Patent
Negishi et al.

(10) Patent No.: US 7,562,380 B2
(45) Date of Patent: Jul. 14, 2009

(54) INTERNET CAMERA SYSTEM

(75) Inventors: Kiyoshi Negishi, Saitama-ken (JP);
Masao Ishikawa, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 238 days.

(21) Appl. No.: 09/983,707

(22) Filed: Oct. 25, 2001

(65) Prior Publication Data
US 2002/0053087 A1    May 2, 2002

(30) Foreign Application Priority Data
Oct. 27, 2000   (JP) ............................ 2000-328348

(51) Int. Cl.
*H04N 7/173*  (2006.01)
*H04N 7/18*   (2006.01)

(52) U.S. Cl. ...................... 725/105; 348/143

(58) Field of Classification Search ............. 348/207.1, 348/207.99
See application file for complete search history.

(56) References Cited

U.S. PATENT DOCUMENTS

| | | |
|---|---|---|
| 4,531,161 A | 7/1985 | Murakoshi |
| 4,746,993 A | 5/1988 | Tada |
| 4,853,733 A | 8/1989 | Watanabe et al. |
| 5,032,918 A | 7/1991 | Ota et al. |
| 5,034,804 A | 7/1991 | Sasaki et al. |
| 5,040,068 A | 8/1991 | Parulski et al. |
| 5,062,010 A | 10/1991 | Saito |
| 5,099,262 A | 3/1992 | Tanaka et al. |
| 5,138,459 A | 8/1992 | Roberts et al. |
| 5,146,353 A | 9/1992 | Isoguchi et al. |
| 5,185,667 A | 2/1993 | Zimmermann |
| 5,231,501 A | 7/1993 | Sakai |
| 5,283,644 A | 2/1994 | Maeno |
| 5,283,655 A | 2/1994 | Usami |
| 5,295,077 A | 3/1994 | Fukuoka |
| 5,343,243 A | 8/1994 | Maeda |

(Continued)

FOREIGN PATENT DOCUMENTS

JP    3-268583    11/1991

(Continued)

OTHER PUBLICATIONS

English language abstract of JP 8-315106.

(Continued)

*Primary Examiner*—David Czekaj
(74) *Attorney, Agent, or Firm*—Greenblum & Bernstein, P.L.C.

(57) ABSTRACT

An Internet camera system is provided with a file server connected to the Internet, an Internet camera provided with a modem, and a terminal device. The Internet camera is capable of capturing an image and converting the same into an image file. Further, the Internet camera is capable of transmitting the image file, through the modem, to the file server via the Internet. The terminal device is connectable to the Internet, and is capable of browsing images the file server stores. The terminal device further includes a transmitting system that transmits predetermined data to the file server. The file server includes a calling system that makes a call to the modem of the Internet camera when the predetermined data is transmitted from the terminal device. The Internet camera is configured to capture an image and transmit an image file of the captured image when the modem receives a call.

23 Claims, 8 Drawing Sheets

U.S. PATENT DOCUMENTS

| | | | |
|---|---|---|---|
| 5,367,332 A | 11/1994 | Kerns et al. |
| 5,402,170 A | 3/1995 | Parulski et al. |
| 5,414,464 A | 5/1995 | Sasaki |
| 5,475,441 A | 12/1995 | Parulski et al. |
| 5,477,264 A | 12/1995 | Sarbadhikari et al. |
| 5,479,206 A | 12/1995 | Ueno et al. |
| 5,486,853 A | 1/1996 | Baxter et al. |
| 5,488,558 A | 1/1996 | Ohki |
| 5,506,617 A | 4/1996 | Parulski et al. |
| 5,528,293 A | 6/1996 | Watanabe |
| 5,535,011 A | 7/1996 | Yamagami et al. |
| 5,541,656 A | 7/1996 | Kare et al. |
| 5,544,315 A | 8/1996 | Lehfeldt et al. |
| 5,550,586 A | 8/1996 | Kudo et al. |
| 5,568,192 A | 10/1996 | Hannah et al. |
| 5,581,299 A | 12/1996 | Raney |
| 5,587,928 A | 12/1996 | Jones et al. |
| 5,606,365 A | 2/1997 | Maurinus et al. |
| 5,612,732 A | 3/1997 | Yuyama et al. |
| 5,631,701 A | 5/1997 | Miyake |
| 5,633,678 A | 5/1997 | Parulski et al. |
| 5,635,983 A | 6/1997 | Ohmori |
| 5,640,204 A | 6/1997 | Tsutsui |
| 5,646,684 A | 7/1997 | Nishikawa et al. |
| 5,724,155 A | 3/1998 | Saito |
| 5,734,425 A | 3/1998 | Takizawa et al. |
| 5,745,167 A * | 4/1998 | Kageyu et al. | 348/153 |
| 5,754,227 A | 5/1998 | Fukuoka |
| 5,796,426 A | 8/1998 | Gullichsen et al. |
| 5,806,005 A | 9/1998 | Hull et al. |
| 5,815,205 A | 9/1998 | Hashimoto et al. |
| 5,818,537 A | 10/1998 | Enokida et al. |
| 5,870,135 A | 2/1999 | Glatt et al. |
| 5,887,140 A | 3/1999 | Itsumi et al. |
| 5,911,044 A | 6/1999 | Lo et al. |
| 5,917,542 A | 6/1999 | Moghadam et al. |
| 5,990,941 A | 11/1999 | Jackson et al. |
| 6,005,611 A | 12/1999 | Gullichsen |
| 6,006,039 A | 12/1999 | Steinberg et al. |
| 6,034,716 A | 3/2000 | Whiting et al. |
| 6,038,296 A | 3/2000 | Brunson et al. |
| 6,043,837 A | 3/2000 | Driscoll, Jr. et al. |
| 6,047,264 A | 4/2000 | Fisher |
| 6,061,502 A | 5/2000 | Ho et al. |
| 6,065,062 A | 5/2000 | Periasamy et al. |
| 6,067,571 A | 5/2000 | Igarashi et al. |
| 6,076,109 A * | 6/2000 | Kikinis | 709/228 |
| 6,094,221 A | 7/2000 | Andersion |
| 6,104,430 A | 8/2000 | Fukuoka |
| 6,134,606 A | 10/2000 | Anderson et al. |
| 6,147,598 A | 11/2000 | Murphy et al. |
| 6,167,469 A * | 12/2000 | Safai et al. | 710/62 |
| 6,188,431 B1 | 2/2001 | Oie |
| 6,195,511 B1 | 2/2001 | Harada |
| 6,204,877 B1 | 3/2001 | Kiyokawa |
| 6,208,426 B1 | 3/2001 | Saito et al. |
| 6,223,190 B1 | 4/2001 | Aihara et al. |
| 6,226,449 B1 | 5/2001 | Inoue et al. |
| 6,256,059 B1 | 7/2001 | Fichtner |
| 6,278,481 B1 | 8/2001 | Schmidt |
| 6,300,976 B1 | 10/2001 | Fukuoka |
| 6,331,869 B1 | 12/2001 | Furlan et al. |
| 6,353,848 B1 | 3/2002 | Morris |
| 6,360,362 B1 | 3/2002 | Fichtner |
| 6,374,406 B2 | 4/2002 | Hirata |
| 6,389,339 B1 * | 5/2002 | Just | 701/33 |
| 6,389,464 B1 | 5/2002 | Krishnamurthy et al. |
| 6,407,752 B1 | 6/2002 | Harnett |
| 6,438,587 B2 | 8/2002 | Kitamura |
| 6,441,924 B1 | 8/2002 | Matsui |
| 6,452,629 B1 | 9/2002 | Aizawa et al. |
| 6,525,761 B2 | 2/2003 | Sato et al. |
| 6,539,547 B2 | 3/2003 | Driscoll, Jr. et al. |
| 6,556,241 B1 * | 4/2003 | Yoshimura et al. | 348/211.99 |
| 6,567,122 B1 | 5/2003 | Anderson et al. |
| 6,571,271 B1 | 5/2003 | Savitzky et al. |
| 6,583,813 B1 | 6/2003 | Enright et al. |
| 6,591,279 B1 | 7/2003 | Emens |
| 6,594,032 B1 | 7/2003 | Hiroki et al. |
| 6,603,502 B2 | 8/2003 | Martin et al. |
| 6,624,846 B1 | 9/2003 | Lassiter |
| 6,636,259 B1 | 10/2003 | Anderson et al. |
| 6,654,060 B1 | 11/2003 | Kurosawa et al. |
| 6,677,989 B1 * | 1/2004 | Aizawa et al. | 348/207.1 |
| 6,720,987 B2 | 4/2004 | Koyanagi et al. |
| 6,747,692 B2 * | 6/2004 | Patel et al. | 348/211.2 |
| 6,751,297 B2 * | 6/2004 | Nelkenbaum | 379/88.13 |
| 6,907,135 B2 * | 6/2005 | Gifford et al. | 382/117 |
| 2001/0017655 A1 | 8/2001 | Araki |
| 2001/0017656 A1 | 8/2001 | Araki |
| 2001/0024232 A1 | 9/2001 | Suzuki |
| 2003/0025803 A1 | 2/2003 | Nakamura et al. |
| 2003/0208567 A1 | 11/2003 | Gross |
| 2004/0012811 A1 | 1/2004 | Nakayama |
| 2005/0099519 A1 * | 5/2005 | Creamer et al. | 348/333.11 |

FOREIGN PATENT DOCUMENTS

| | | |
|---|---|---|
| JP | 4-980 | 1/1992 |
| JP | 5-145664 | 6/1993 |
| JP | 5-166090 | 7/1993 |
| JP | 5-167979 | 7/1993 |
| JP | 8-102837 | 4/1996 |
| JP | 5-153453 | 6/1996 |
| JP | 8-171691 | 7/1996 |
| JP | 8-315106 | 11/1996 |
| JP | 8-317268 | 11/1996 |
| JP | 9-288684 | 11/1997 |
| JP | 9-307794 | 11/1997 |
| JP | 10224676 | 8/1998 |
| JP | 10243153 | 9/1998 |
| JP | 10320685 | 12/1998 |
| JP | 11-27567 | 1/1999 |
| JP | 11-27650 | 1/1999 |
| JP | 11-298627 | 10/1999 |
| JP | 11 3 41338 | 12/1999 |
| JP | 3034243 | 2/2000 |
| JP | 2002-27427 | 1/2002 |
| WO | 91/07850 | 5/1991 |
| WO | 96/02106 | 1/1996 |
| WO | 99/48276 | 9/1999 |
| WO | 00/07341 | 2/2000 |

OTHER PUBLICATIONS

English language abstract of JP 10-224676.
English language absract of JP 10-320685.
English language abstract of JP 3034243.
Printout (labeled W-1) of a World Wide Web site (Web site) relating to a "Hitachi MPEGCAM", 5 pages, printed Jul. 8, 1997.
Printout (labeled W-2) of a Web site relating to a "Microplex NetWorkEye", 2 pages, printed Aug. 14, 1997.
Printout (labeled W-3) of a Web site relating to a "StarDot WinCam", 3 pages, printed Aug. 5, 1997.
Printout (labeled W-4) of a Web site relating to an "MRT Observer", 1 page, printed Aug. 14, 1997.
Printout (labeled W-5) of a Web site relating to a "Carecams RCS5000", 1 page, printed Aug. 14, 1997.
Printout (labeled W-6A) of a Web site relating to an "EarthCam Internet Camera", 2 pages, printed Aug. 14, 1997.
Printout (labeled W-6B) of a Web site relating to the "EarthCam Internet Camera", 10 pages, printed Oct. 3, 1997.
Printout (labeled W-7) of a Web site relating to an "Axis NetEye", 1 page, printed Aug. 14, 1997.

Ricoh Digital Electronic Still (Video) Camera, Instruction Manual for Using DC-1, 1995, with partial English language translation.

Ricoh DC-1 brochure, May, 1995, with partial English language translation.

References, documents, and arguments cited by opponents to the above-mentioned Japanese Patent No. 3034243, two official communications regarding the same, and Reasons for Revocation regarding the same.

Table of "Correspondence of page numbers between the pages in Japanese documents and the pages in the English Translations", 3 pages (also submitted herewith are counterpart U.S. Patents where the same exist, or English language translations of each document where no counterpart U.S. Patent exists).

The official communication (enclosed with a full English language translation), dated Dec. 15, 2000.

*Intranet TC/PIP Bible*, Chapter 5, "TCP and UDP", pp. 62-99, Nobukazu IGUCHI, Ohm, Inc., May 30, 1997, along with a full English language translation.

*Internet Yearbook '96*, vol. 1, Sections 2,4, pp. 28-33, 208-229, Gijyuto Hyouroun Inc., Apr. 5, 1996, along with a full English language translation.

The second set of opposition documents and arguments was submitted by opposer Watanabe in an opposition dated Oct. 17, 2000.

Various "Sharp Zaurus MI-504 and MI-506" materials, including an "Introductory" Instruction Manual, pp. 18-19, 182-193, 234-235; a "Functional" Instruction Manual, pp. 1-5, 82-83; a "Zaurus Communication" Instruction Manual, pp. 1-7, 74-75, 124-125, 128-129; and a press release dated Jun. 23, 1997, pp. 1/11-11/11, this product asserted to have been first described in the press release document dated Jun. 23, 1997, (the Instruction Manuals appearing at least after the product introduction, apparently scheduled for Jul. 17, 1997) along with a full English language translation.

Notice of Reason for Revocation of Japanese Patent No. 3034243, along with a full English language translation.

3.3 Connectionless Transport: UDP, Ross and Kurose, http://www-net.cs.umass.edu/kurose/transport/UDP.html, 1996-2000.

English Language Abstract of JP8-171691.

English Language Abstract of JP8-102837.

P.M. Corcoran et al., "Internet Enabled Digital Photography", IEEE, pp. 84-85.

Eng. Trans of NEC Picona digital, Instruction Manual for PC-DC200 and PC-DC200K.

A printout of a News Release from NEC dated Feb. 13, 1997, relating to Picona digital camera.

NEC Picona digital camera, Instruction Manual for PC-DC200 and PC-DC200K.

English Language Abstract of JP 11-27567.

English Language Abstract of JP11-27650.

Printout of a Website relating to Samsung "Webthru" cameras, printed on Aug. 14, 2001.

Samsung Webthru SWC 101/104 User's Guide, printed from Webthru web site on Aug. 14, 2001.

Samsung Webthru SWC160 User's Guide, printed from Webthru web site on Aug. 14, 2001.

A printout of a News Release from Apple dated May 13, 1996, relating to QuickTime image capture system.

"Apple's New Image-Capture Platform", Apple Directions, Aug. 1996, pp. 1, 15, 17-21.

A printout of a Press Release from Apple dated Feb. 17, 1997, relating to QuickTake 200 digital camera.

A printout of Apple Service Source Manual for QuickTake 200 digital camera.

A printout of Press Release from FlashPoint dated Dec. 8, 1997, relating to Digita operating system.

A printout of a Press Release from FlashPoint dated Jun. 15, 1998, relating to Kodak DC 220 and DC 260 cameras with Digita operating system.

"Digita Camera Operating System", the Kleper Report on Digital Publishing, Issue 3.6, Nov./Dec. 1998.

"FlashPoint shows how to process digital photos without a PC", EE Times, posted Apr. 16, 1998.

A copy of a facsimile press release, PR Newswire file No. p1210083.106, transmitted Dec. 10, 1996, relating to an "Axis NetEye 200".

A printout (labeled W-8) of a Web site relating to "Omniview: Electronic Aim and Zoom Camera", printed on Feb. 6, 2001.

A printout (labeled W-9) of a Web site relating to "Interactive Pictures Presents the Whole Picture", printed on Feb. 6, 2001.

A printout (labeled W-10A) of a Web site relating to "Omniview Motionless Camera Orientation System", printed on Feb. 6, 2001.

A printout (labeled W-10B) of a Web site relating to "Stationary Camera Aims and Zooms Electronically", printed on Feb. 6, 2001.

Notice of Sending Copies of Written Opinions issued with regard to Japanese Patent No. 3034243, together with an English language translation of the same.

English Language Abstract of JP 2002-27427.

Axis 200+ Quick Installation Guide, Revision 1.0, having an indicated date thereon of Feb. 1998, which was downloaded/printed in 2006.

Axis 200+ Web Camera Product Page, downloaded/printed in Sep. 2006, which indicates that a User Manual for the Axis 200+ was updated on Jan. 30, 1998.

User Report, with an English language translation, Aug. 1998.

Axis NetEye literature obtained from the website http://www.axis.com, including Axis NetEye 200 Datasheet, Features and Benefits, Technical Overview, Alternative Solutions; A NetEye's View, and a Live NetEye Snapshot, downloaded/printed in Dec. 1996.

*Smile, You're on the Web*, Pipeline, PC Magazine, having an indicated date thereon of Dec. 3, 1996, at 9.

*I Spy with my little NetEye*, PCWeek Netweek, Nov. 4, 1996, at N1, N15.

Axis 200 Quick Installation Guide, Revision 1.5, having an indicated date thereon of Oct. 1997, which was downloaded/printed in Jul. 2006.

A dialog printout of *WebSheet*, Manufacturing Systems, vol. 15, No. 7, having an indicated date thereon of Jul. 1997, at 14.

A Dialog printout of Stephen Pritchard, *How to Get Your Camera Rolling*, Independent (London), 3d. Ed, having an indicated date thereon of Feb. 3, 1997 at 11.

English language Abstract of JP 11-341338.

* cited by examiner

INTERNET CAMERA SYSTEM

BACKGROUND OF THE INVENTION

The present invention relates to an Internet camera system, which includes a file server connected to the Internet, an Internet camera capable of transmitting image files to the file server through a public telephone network, and a terminal device capable of viewing the images transmitted to and stored in the file server.

An example of a conventional Internet camera is disclosed in Japanese patent No. 3034243. The Internet camera disclosed in the above-described patent includes an Internet camera which is capable of transmitting digital image data to a predetermined file server connected to the Internet in accordance with a predetermined schedule.

In the above system, a user having an account in the predetermined file server uses a terminal device, which is connected to the Internet and has a client function for the file server, and views the images stored in the file server in the form of image files.

However, in the conventional Internet camera system, it is only possible to view the images, which have been transmitted from the camera in accordance with the predetermined schedule, e.g., at every predetermined interval, and it has been impossible for a user to view images captured at user's desired timings.

SUMMARY OF THE INVENTION

It is therefore an object of the invention to provide an Internet camera system with which a user is capable of viewing images, which are captured at on-demand timings.

For the object, according to the invention, there is provided an improved Internet camera system which is provided with a file server connected to the Internet, an Internet camera provided with a modem, the Internet camera being capable of capturing an image and converting the same into an image file, the Internet camera being capable of transmitting the image file through the modem to the file server via the Internet, a terminal device connectable to the Internet. The terminal device is capable of browsing images stored in the file server, and includes a transmitting system that transmits predetermined data to the file server. The file server includes a calling system that makes a call to the modem of the Internet camera. The Internet camera is configured to capture an image and transmit an image file of the captured image when the modem receives a call which may be made by the calling system of the file server.

With this configuration, a user can view an image which is captured at a desired timing.

Optionally, the file server may transmit, to the terminal device, data indicative of completion of file transmission from the Internet camera to the file server, which is performed when the modem receives a call. Since the data indicating the completion of the transmission is sent to the terminal device, it is ensured that the updated (i.e., newly transmitted) image can be viewed by the terminal device.

Further, the modem does not establish a connection with respect to the call. Since the connection will not established, no charge is required when the file server accesses the Internet camera.

Still optionally, the terminal device may include an input system through which operation commands can be input, and the transmitting system may transmit the predetermined data in response to a predetermined operation of the input system.

Preferably, the terminal device includes a monitor that is capable of displaying images stored in the file server, and the input system may include a pointing device which is manually operable to move a pointer displayed on the monitor. The pointing device may be provided with a button member, and the transmitting system transmits the predetermined data when the pointer is located on a predetermined image on the monitor by moving the pointing device, and then, the button member is depressed.

With this configuration, a user may visually select the image to be updated, and send the request to the file server only by depressing the button member.

Optionally, the Internet camera system may include a plurality of Internet cameras each of which is capable of transmitting an image file to the file server.

Also in this case, the terminal device may include an input system through which operation commands can be input, the transmitting system may transmit the predetermined data to the file server in accordance with predetermined operations of the input system, and the calling system makes a call to the modem of at least one of the plurality of Internet cameras in response to the predetermined data.

Further, the terminal device may include a monitor that is capable of displaying images, which are captured by the plurality of Internet cameras, transmitted therefrom and stored in the file server, and the input system may include a pointing device which is manually operable to move a pointer displayed on the monitor, the pointing device being provided with a button member. When the pointer is located on one of predetermined images on the monitor by moving the pointing device, and then, the button member is depressed, the transmitting system transmits the predetermined data to one of the plurality of Internet cameras in accordance with the image on which the pointer is located and the button member is depressed. The calling system makes a call to the modem of one of the plurality of Internet cameras in response to the predetermined data.

Optionally, the Internet camera is configured to transmit an image file only when said call is made by said calling system of said file server.

Optionally or alternatively, the calling system makes calls to all the modems of the plurality of Internet cameras when the pointer is located on a predetermined image on the monitor by moving the pointing device, and then, the button member is depressed.

Still optionally, the modem may be capable of identifying a caller currently calling, and the Internet camera may be configured to transmit an image file only when the call comes from a predetermined caller.

In a particular case, the modem identifies the caller based on a telephone number transmitted through a telephone line.

Further, the Internet camera may be programmed to capture and transmit image files in accordance with a predetermined schedule. With this configuration, even if there is no request from the terminal, the image files at the server are updated automatically.

BRIEF DESCRIPTION OF THE EMBODIMENT

FIG. 1 schematically shows a configuration of an Internet camera system according to an embodiment of the invention;

DETAILED DESCRIPTION OF THE EMBODIMENT

Hereinafter, an Internet camera system according to an embodiment of the invention will be described with reference to the accompanying drawings.

Figure 1:
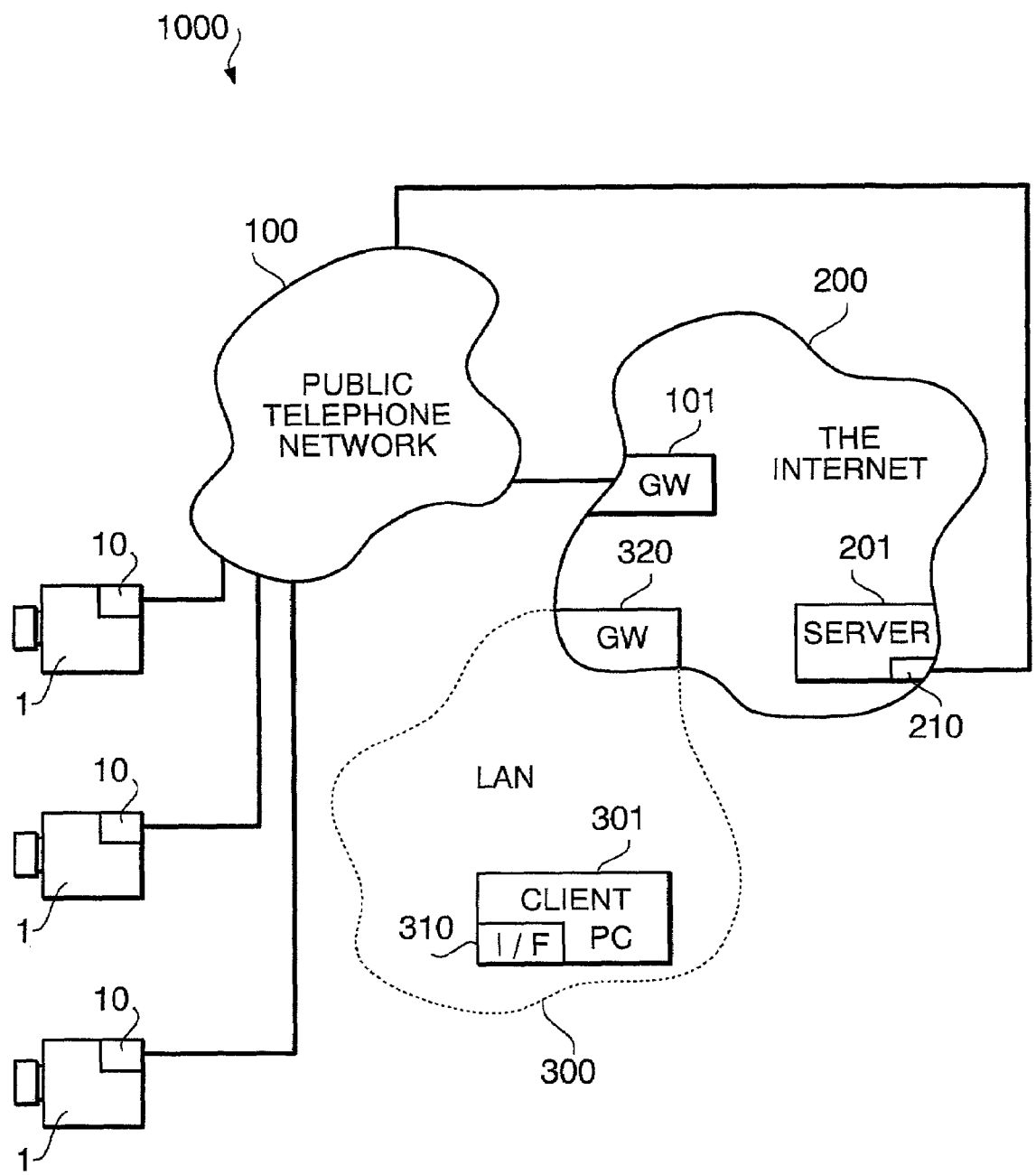

FIG. 1 is a block diagram schematically illustrating a configuration of an Internet camera system 1000 according to an embodiment of the invention.

As shown in FIG. 1, the Internet camera system 1000 includes one or more Internet cameras 1 (three cameras in FIG. 1), a file server 201 connected to the Internet 200, and at least one client PC (Personal Computer) 301 connected to a LAN (local area network) 300 that is connected to the Internet 200. It should be noted that the number of the Internet camera 1 is three in FIG. 1. However, the number is not limited to three, and any number of cameras (one or more cameras) can be used.

The Internet camera 1 captures images and transmits the captured images to the file server 201 as image files. Specifically, the Internet camera 1 is provided with a modem 10, which is capable of communicating with a first gateway 101 through a public telephone network (also referred to as a "circuit-switched network") 100, thereby the Internet camera 1 is connected with the Internet 200. When the Internet camera 1 is connected to the Internet 200, it becomes possible that the Internet camera 1 transmits/receives data to/from the file server 201 through the Internet 200.

The file server 201 provides an FTP service, an SMTP service, a POP service and an HTTP service. Further, the file server 201 is provided with a modem 210 and is capable of making a call through the public telephone network 100.

The client PC 301 on the LAN 300 is provided with a network interface 310 such as an Ethernet card. The network interface 310 communicates with a second gateway 320, which is connected to both the Internet 200 and the LAN 300, 50 that the client PC 301 is connected to the Internet 200. When the client PC 301 is connected to the Internet 200, it becomes possible that the client PC 301 transmits/receives data to/from the file server 201.

Figure 2:
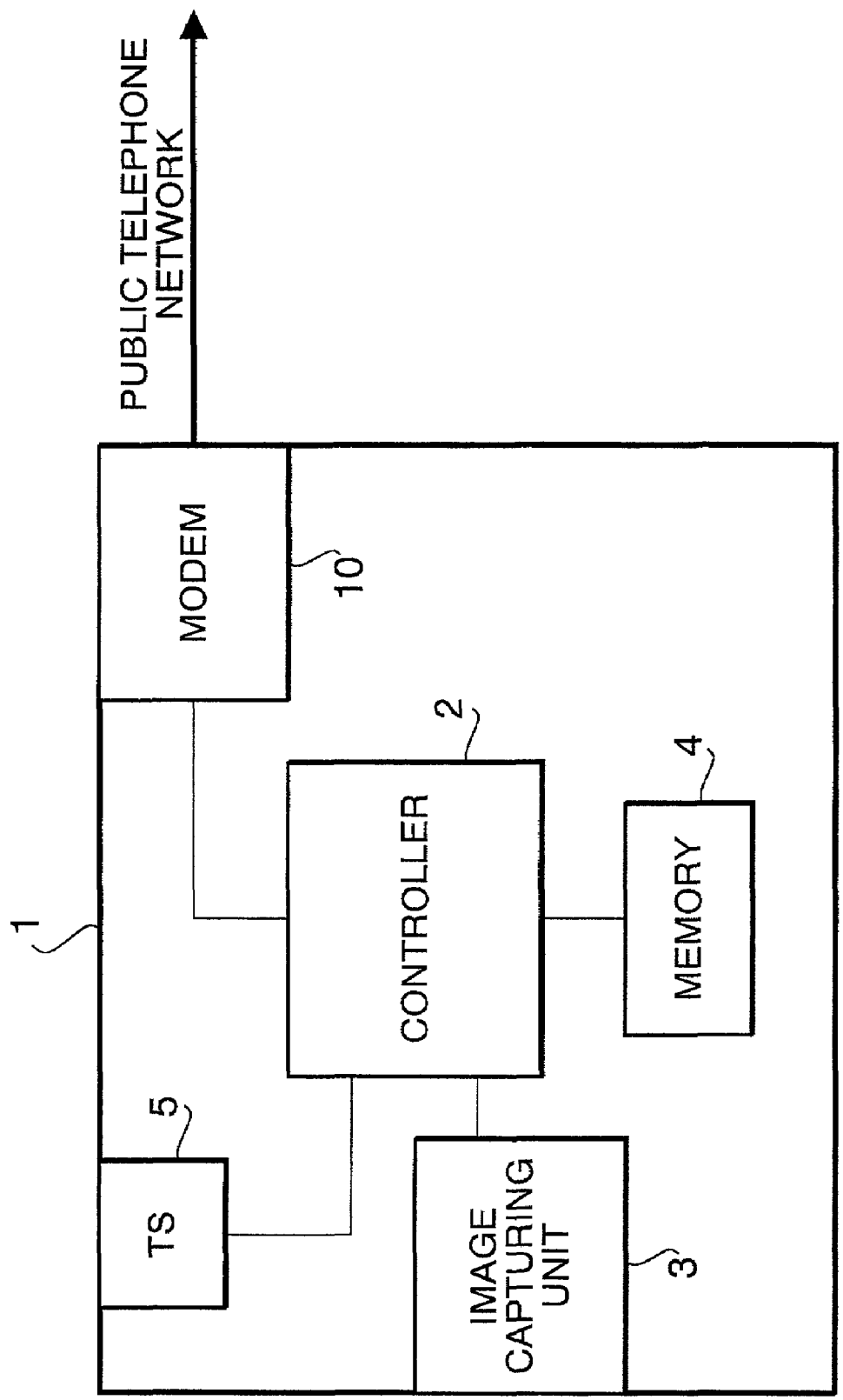
FIG. 2 shows a configuration of an Internet camera employed in the Internet camera system shown in FIG. 1.

FIG. 2 is a block diagram showing a configuration of the Internet camera 1. The Internet camera 1 is provided with an image capturing unit 3, which includes an objective optical system and an image capturing element such as a CCD (Charge Coupled Device) for receiving an image formed by the objective optical system and outputting image signals. The image capturing unit 3 converts the outputs of the CCD into digital image signals and outputs the same to a controller 2. The controller 2 controls the image capturing unit 3 and a memory 4, and stores the captured image in the memory 4 as an image file having a predetermined image format such as a JPEG format. That is, the image signals output by the CCD are converted into digital image signals, and then stored in the memory 4 as an image file.

The memory 4 stores a schedule data as well as image files. The controller 2 generates the image files in accordance with a schedule indicated by the schedule data.

In this embodiment, the image capturing element is continuously driven and continuously outputs image signals, and when an image file is to be stored, the image signals currently output are converted into an image file. It may be possible to modify the configuration such that the image signals are output only when an image file is to be stored.

Further, in the memory 4, an FTP client program is stored. The controller 2 establishes a connection to the Internet 200, after an image file is stored in the memory 4 in accordance with the schedule, and transmits the image file to the file server 201 under control of the FTP client program file. In this embodiment, the connection of the Internet camera 1 with the Internet 200 is forcibly cut after the image file is transmitted. Therefore, a communication cost for transmitting the image files is remained to minimum. Further, as will be described later, with this control, the modem 10 is capable of receiving a call when data transmission is performed between the Internet camera 1 and the file server 201.

In the memory 4, an e-mail client program for transmitting/receiving e-mails using the SMTP and POP is also stored. The controller 2 of the Internet camera 1 establishes a connection with the Internet 200 at every predetermined interval, checks a mailbox in the file server 201. If an e-mail message representative of an updated schedule is received, the controller 2 updates the schedule data by overwriting the schedule data stored in the memory 4 with the received schedule data. After such an e-mail message is received, the connection with the Internet 200 is forcibly cut.

The Internet camera 1 is provided with a trigger switch 5. When the trigger switch 5 is operated, an image signal which is being output by the image capturing unit 3 is converted into an image file by the controller 2, stored in the memory 4, and is transmitted to the file server 201 through the Internet 200 in a manner similar to the case of the scheduled transmission of the image file. Also in this case, the connection with the Internet 200 is forcibly cut when the image file has been transmitted to the file server 201.

Figure 3:
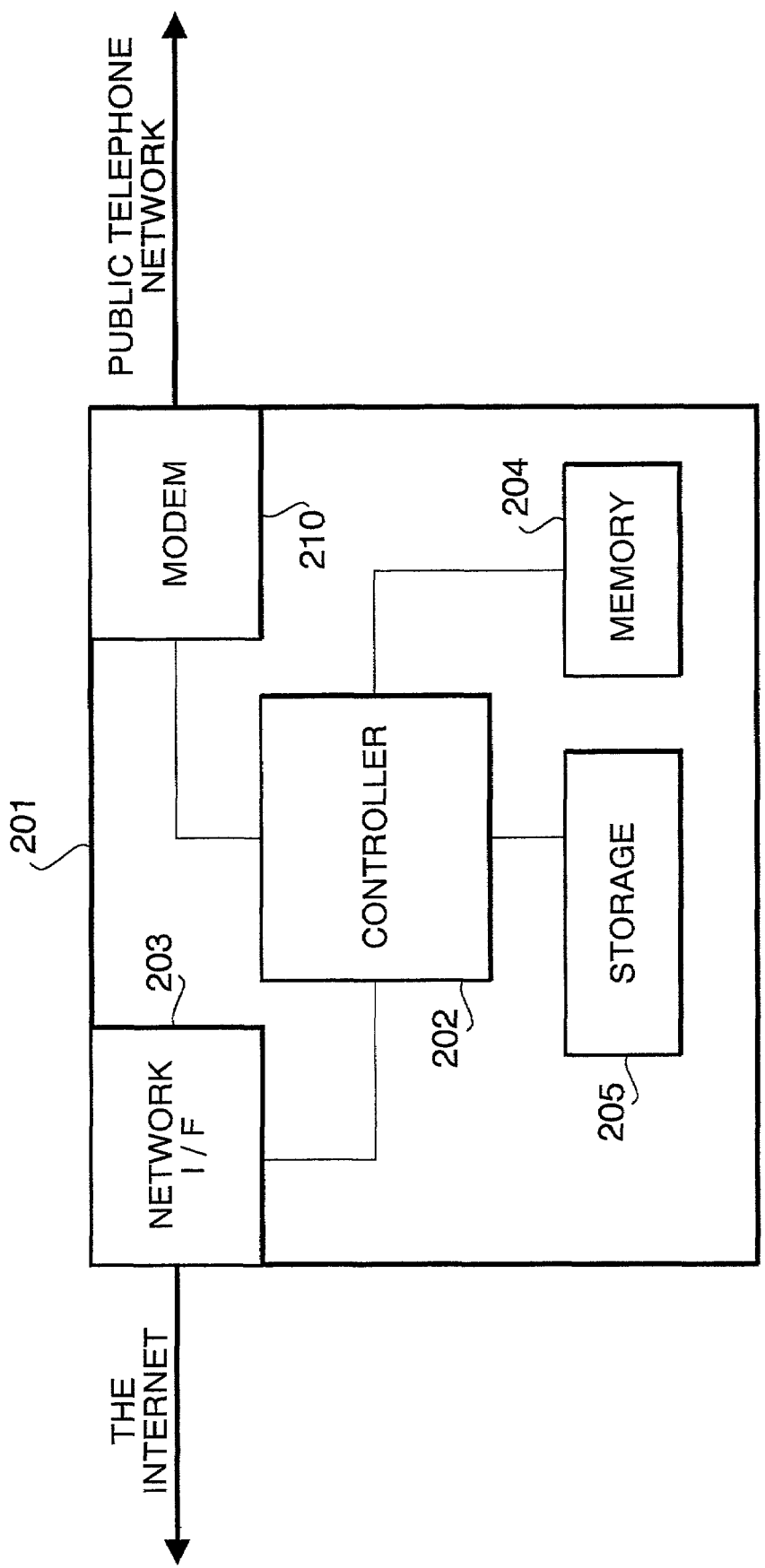
FIG. 3 shows a configuration of a file server employed in the Internet camera system shown in FIG. 1.

FIG. 3 is a block diagram of the file server 201 connected to the Internet 200. The file server 201 includes a network interface 203 for exchanging data through the Internet 200, and a storage device 205 for storing various data files. The file server 201 includes a controller 202, which controls the network interface 203 to receive image files transmitted from the Internet camera 1 through the Internet, and controls the storage device 205 to store the received image files at predetermined directories defined therein.

The storing operation of the image files are executed under a control of the FTP service program stored in the memory 204.

The HTTP service program stored in the memory 204 enables a client connected to the Internet 200 to browse the image files stored in the predetermined directories of the storage device 205.

The file server 201 further includes a modem 210. The controller 202 is capable of making a call to an arbitrary telephone number using the modem 210.

Figure 4:
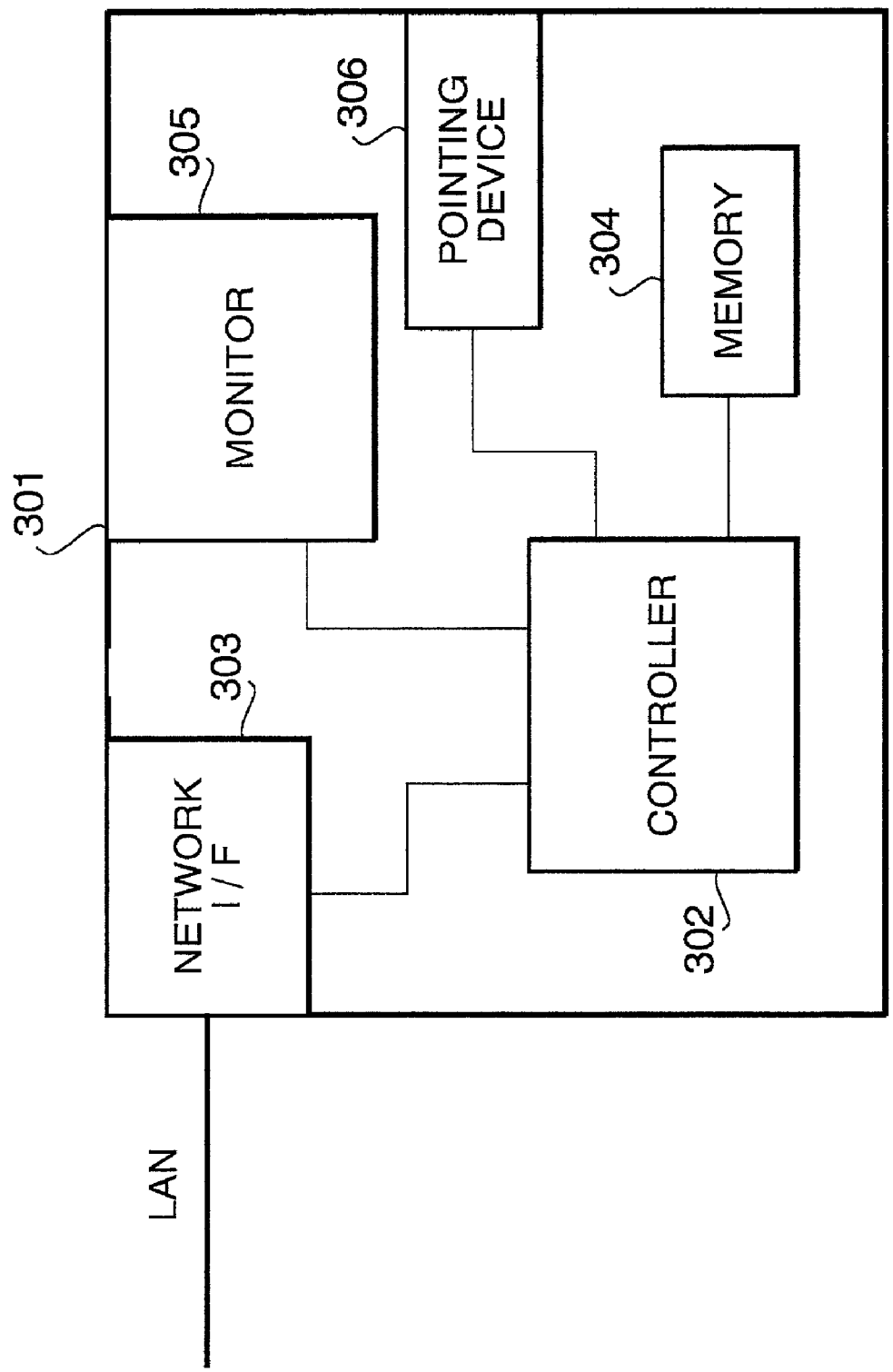
FIG. 4 shows a configuration of a client PC employed in the Internet camera system shown in FIG. 1.

FIG. 4 is a block diagram of the client PC 301 connected to the LAN 300. The client PC 301 is permanently connected to the LAN 300. The client PC 301 is provided with a network interface 303, which connects the client PC with the LAN 300. The network interface 303 is connectable to the Internet 200 through a second gateway 320 on the LAN 300.

The client PC 301 further includes a memory 304. The memory 304 stores an HTTP client program for transmitting/receiving data to/from the file server 201 in accordance with the HTTP. The client PC 301 includes a controller 302, which executes the HTTP client program and controls the network interface 303. A desired one of the image files stored in the storage device 205 of the file server 201 can be transmitted to the memory 304 of the client PC 301 through the network interface 303.

The client PC 301 is further provided with a monitor 305. The HTTP client program is capable of displaying an image contained in an image file stored in the memory 304 on the monitor 305. Thus, the client PC 301, on which the HTTP client program is executed, is capable of displaying images contained in the image files which are transmitted from the Internet camera 1 to the file server 201 in accordance with the schedule data. That is, a user of the client PC 301 is capable of browsing the images, which are captured by the Internet camera 1 in accordance with the schedule data, on the monitor 305 of the client PC 301, which is remote from the Internet camera 1.

Furthermore, the client PC 301 is provided with a pointing device 306 (e.g., a mouse) which is used for moving a pointer displayed on the monitor 305. The user of the client PC 305 is capable of moving, under control of the HTTP client program, the pointer on the monitor 305 using the pointing device 306. The pointing device 306 is generally provided with at least one button. When the button depressed, data representative of a position of the pointer on the screen of the monitor 305 when the button is depressed is transmitted to the controller 302 of the client PC 301.

Figure 5:
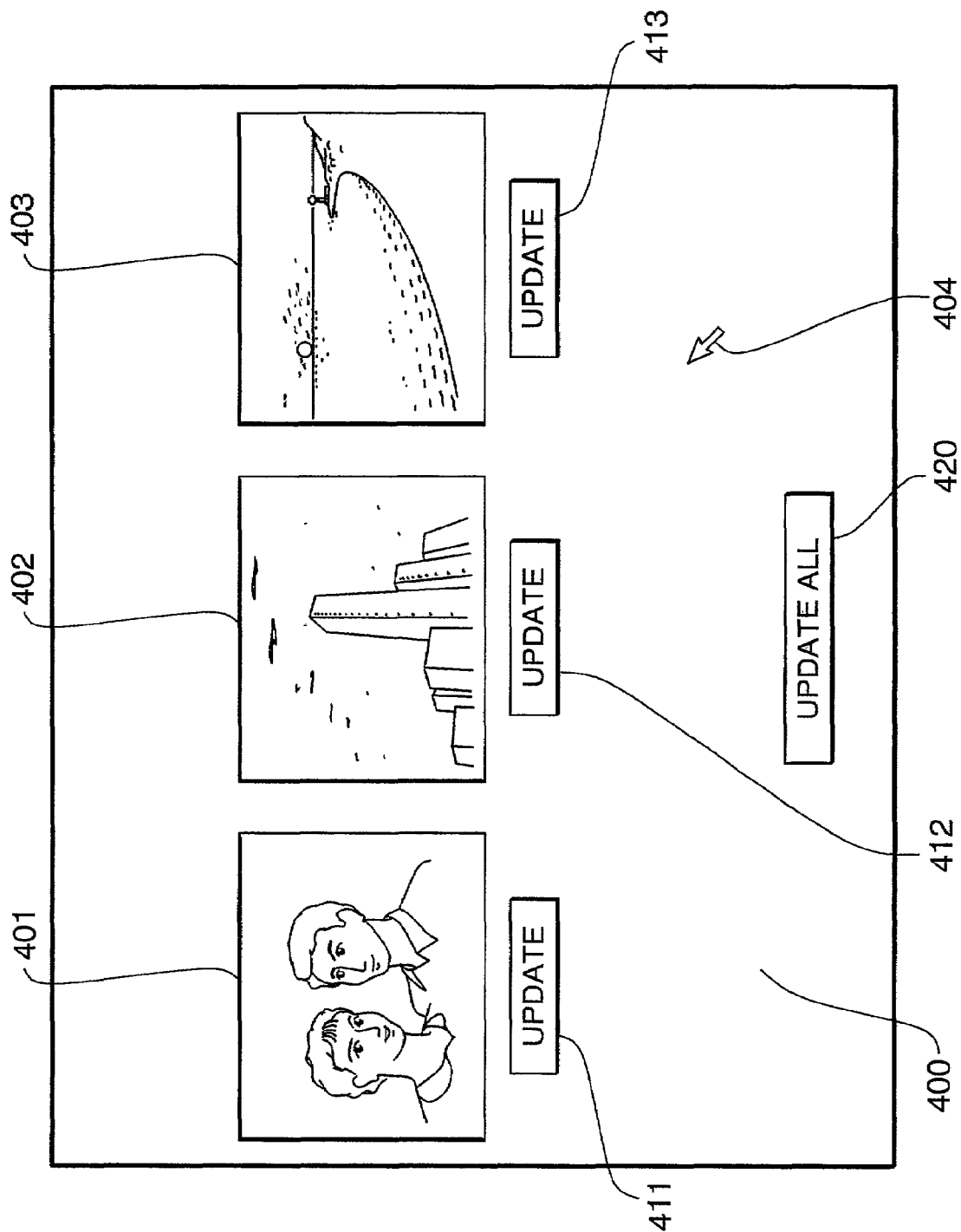
FIG. 5 shows an exemplary screen image of a monitoring device of the client PC.

FIG. 5 shows an exemplary screen image of the monitor 305. FIG. 5 shows a case where three cameras 1 are provided in the Internet camera system 1000. It should be noted, however, the invention is not limited to this configuration, and the number of the Internet cameras 1 can be any other number. On the screen 400 shown in FIG. 5, three image displaying areas 401, 402 and 403 are indicated, in which the images files that are captured by the three Internet cameras 1 and transmitted to the file server 201 are displayed, respectively.

The HTTP client program accesses the file sever 201 at every predetermined interval (e.g., one minute). In the image displaying areas 401, 402 and 403, the latest images captured by and transmitted from the Internet cameras 1, and the times when they were captured are displayed, respectively.

As shown in FIG. 5, below the image displaying areas 401, 402 and 403, first update buttons 411, 412 and 413 are provided, respectively. When a pointer 404 is located at one of the first update buttons 411, 412 and 413, and a button of the pointing device 306 is depressed (this operation will be referred to as clicking of an update button), the image displayed in the image displaying area 401, 402 or 403 above the clicked first update button 411, 412 or 413 is updated. That is, the image signal output by the image capturing unit 3 of the Internet camera 1 corresponding to the clicked button is converted into an image file, the image file is transmitted from the Internet camera 1 and displayed in the corresponding image displaying area.

Further, on the lower portion of the screen, a second update button 420 is provided. When the second update button 420 is clicked, all the images displayed in the image displaying areas 401, 402 and 403 are updated.

Operations of the client PC 301, the file server 201 and the Internet camera 1 when the first update button 401, or 403 is clicked will be described with reference to the charts shown in FIGS. 6, 7 and 8.

Figure 6:
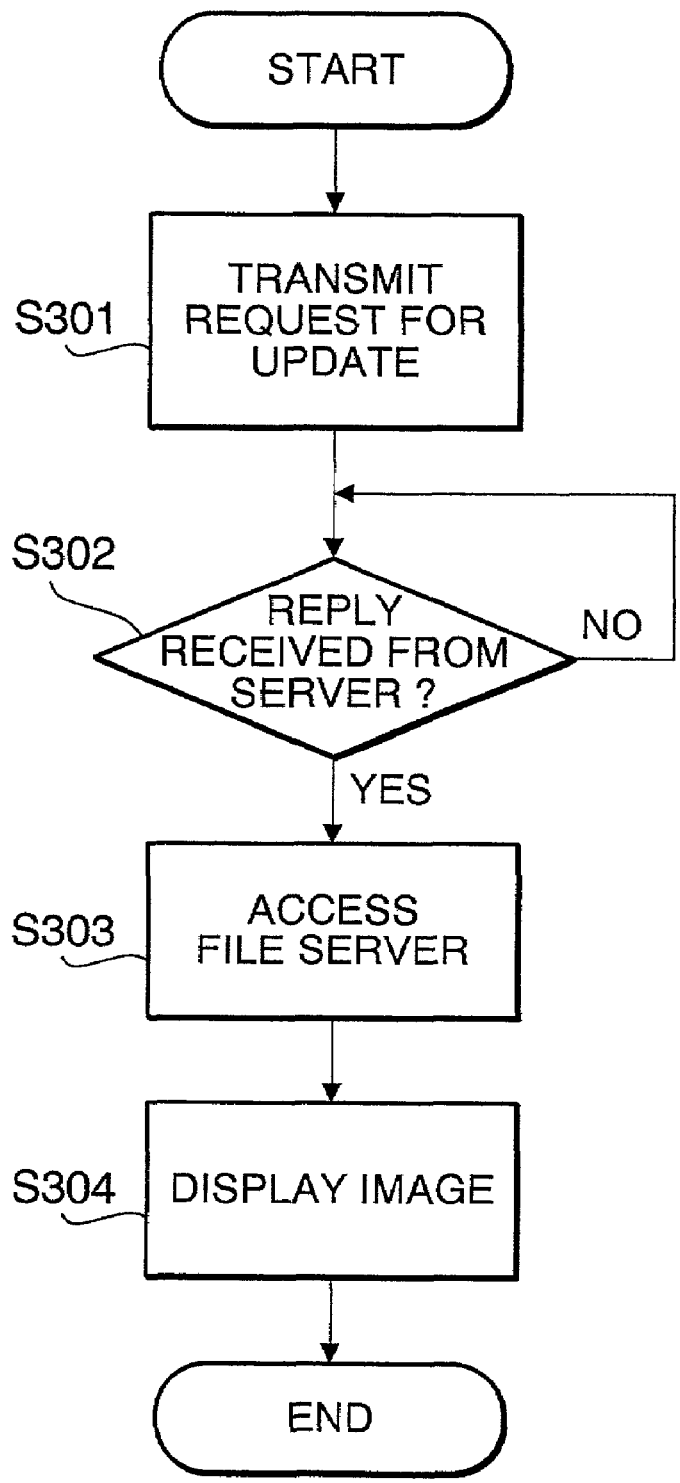
FIG. 6 is a flowchart illustrating an interruption procedure executed at the client PC.

FIG. 6 is a flowchart illustrating an image update operation, which is an interruption, of the client PC 301 when first update button 411, 412 or 413 is clicked.

When the first update button 411, 412 or 413 is clicked, the controller 302 transmits a request for capturing image of the Internet camera 1 corresponding to the clicked button, to the file server 201 (S301).

Figure 7:
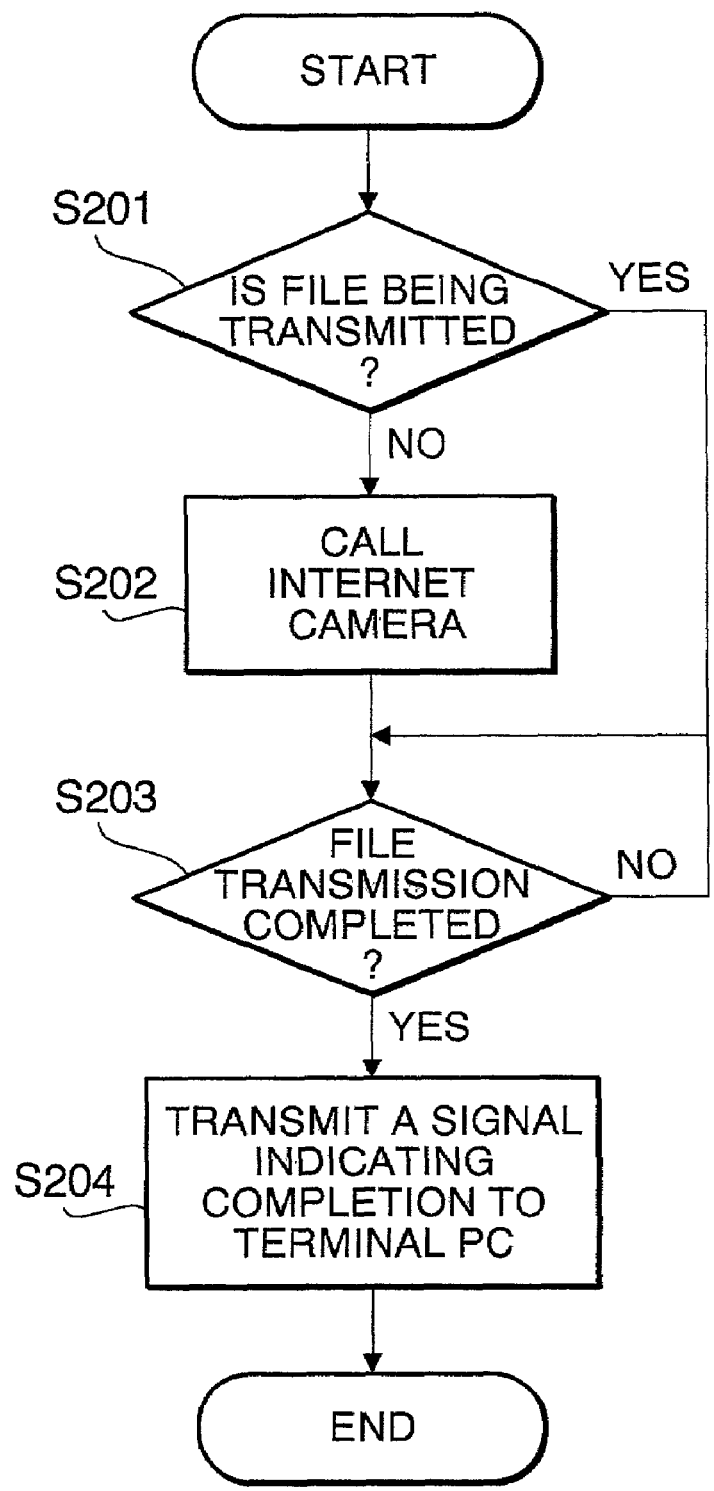
FIG. 7 is a flowchart illustration an interruption procedure executed at the file server.

The file server 201 starts the interruption operation shown in FIG. 7 when it receives the request for capturing an image from the client PC 301.

The controller 302 waits for receipt of a reply indicating completion of the image capture from the file server 201 at S302. When the client PC 301 receives the reply from the server 201 (S302: YES), it accesses the file server 201 to download the image file which has been transmitted from the Internet camera 1 to the file server 201 in response to the request transmitted at S303. In S304, the image file downloaded in S303 is displayed in the image displaying area corresponding to the clicked first update button, and the interruption shown in FIG. 6 is terminated.

FIG. 7 shows the interruption executed by the file server 201 when it receives the request from the client PC 301 (see S301 of FIG. 6).

In S201, it is judged whether the Internet camera 1 is transmitting an image file to the file server 201. If the image file is being transmitted (S201: YES), control proceeds to S203. If the image file is not being transmitted (S201: NO), the controller 202 controls the modem 210 to make a call to the Internet camera 1 corresponding to the clicked update button. Then, the controller 202 controls the modem 210 to disconnect the call after several ringing tones have been generated, and the controller 202 controls the modem 210 to be in a waiting condition to wait for a file transmission from the Internet camera 1. When the modem 10 of the Internet camera 1 receives the call, the interruption shown in FIG. 8 is executed. As will be described, the Internet camera 1 transmits an image file to the file server 201 when the modem 10 receives the call.

In S203, control waits for the completion of the file transmission from the Internet camera 1. When the file transmission from the Internet camera 1 has been completed (S203: YES), the controller 202 transmits a signal indicating the completion of the image capture to the client PC 301 (S204), and the interruption shown in FIG. 7 is terminated.

Figure 8:
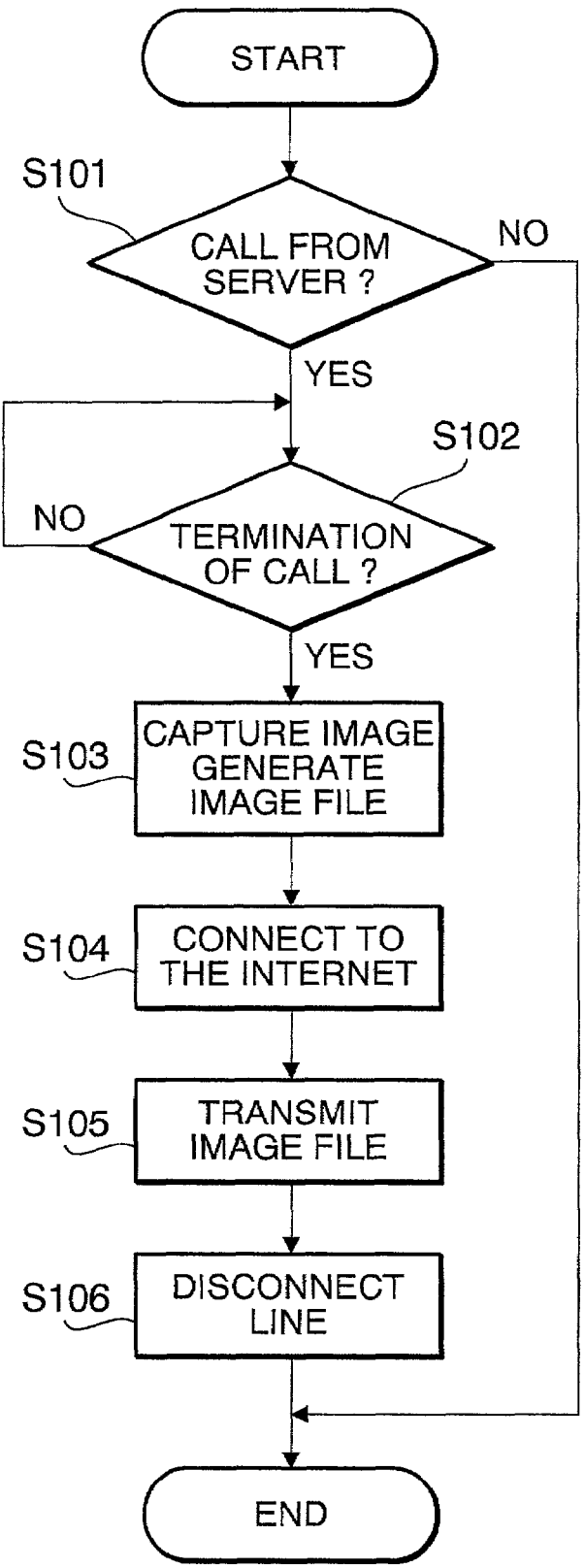
FIG. 8 is a flowchart illustrating an interruption procedure executed at the Internet camera.

FIG. 8 shows the interruption executed by the Internet camera 1. This interruption is initiated when the modem 10 receives a call.

In S101, the controller 2 judges whether the received call comes from the file server 201. The judgment in S101 is performed by making use of a caller ID service provided by the public telephone network 100. The call ID service provides data identifying a caller is transmitted to a called station from an exchanger of the public telephone network 100. Typically, the telephone number of a caller is transmitted to a called station. If the caller is the file server (e.g., when the telephone number of the caller is identical to that of the line to which the modem 210 of the file server 201 is connected) (S101: YES), control proceeds to S102. Otherwise, i.e., the caller is not identified as the file server 201 (S101: NO), the interruption shown in FIG. 8 is terminated without responding to the caller. Thus, if the Internet camera 1 is erroneously called from a caller other than the file server 201, the Internet camera 1 does not transmit the image file to the file server 201.

It should be noted that, although the caller ID is received, the call is not received (i.e., the connection will not be established).

In S102, the controller 2 does not respond to the call and waits for the termination of the call from the file server 201 (S102: NO). Therefore, the file server 201 will not be charged for the access to the Internet camera 1. When the disconnection is confirmed (S102: YES), control proceeds to S103. In S103, the digital image signal output by the image capturing unit 3 is converted into an image file, which is stored in the memory 4. Then, in S104, the controller 2 controls the modem 10 to establish the connection to the Internet 200. In S105, the image file stored in the memory 4 is transmitted to the file server 201. Then, in S106, the connection with the Internet 200 is cut, and the interruption shown in FIG. 8 is terminated.

It should be noted that S101 of FIG. 8 is an optional procedure and may be omitted. In such a case, upon receipt of a call, the Internet camera 1 transmits an image file to the file server 201, without identifying the caller.

At this stage, the Internet camera 1 has finished transmitting the image file to the file server 201. Therefore, as described above, the judgment at S203 in FIG. 7 becomes affirmative, and the controller 202 executes the procedure in S204 of FIG. 7. Then, the judgment at S302 in FIG. 6 becomes affirmative.

The controller 302 executes a procedure in S303 of FIG. 6, where the client PC 301 accesses the file server 201 and downloads the image file transmitted from the Internet camera 1 to the file server 201.

It should be noted that when the second update button 420 is depressed, for each of the Internet cameras 1, the procedures shown in FIGS. 6-8 are executed, respectively. Accordingly, the images displayed in the image displaying areas 401, 402 and 403 are updated, respectively.

The present disclosure relates to the subject matter contained in the Japanese Patent Application No. 2000-328348, filed on Oct. 27, 2000, which is expressly incorporated herein by reference in its entirety.

What is claimed is:

1. An Internet camera system, comprising:
a file server connected to the Internet;
an Internet camera provided with a modem, said Internet camera being capable of capturing an image and converting the same into an image file, said Internet camera being capable of transmitting said image file through said modem to said file server via a public telephone network and the Internet according to a predetermined schedule; and
a terminal device connectable to the Internet, said terminal device being capable of browsing images stored in said file server,
said terminal device including a transmitting system that transmits predetermined data to said file server,
said file server including a calling system that determines whether said Internet camera is transmitting an image file to said file server and makes a call, via the public telephone network, to said modem if it determines that said Internet camera is not transmitting an image file to said file server, said calling system interrupting the call without establishing a connection to the modem,
when said modem receives the call, said Internet camera ignoring the call received by the modem, waiting until the connection with the public telephone network is interrupted, and capturing an image and transmitting an image file of the captured image, said modem failing to establish a connection with respect to the call.

2. The Internet camera system according to claim 1, wherein said file server transmits data to said terminal device, said data being indicative of completion of file transmission from said Internet camera to said file server, said file transmission being performed when said modem receives said call.

3. The Internet camera system according to claim 1, wherein said terminal device includes an input system through which operation commands can be input, and wherein said transmitting system transmits said predetermined data in response to a predetermined operation of said input system.

4. The Internet camera system according to claim 3, wherein said terminal device includes a monitor that is capable of displaying images stored in said file server, wherein said input system includes a pointing device which is manually operable to move a pointer displayed on said monitor, said pointing device being provided with a button member, and
wherein said transmitting system transmits said predetermined data when said pointer is located on a predetermined image on said monitor by moving said pointing device, and then, said button member is depressed.

5. The Internet camera system according to claim 1, comprising a plurality of Internet cameras each of which is capable of transmitting said image file to said file server.

6. The Internet camera system according to claim 5, wherein said terminal device includes an input system through which operation commands can be input, and wherein said transmitting system transmits said predetermined data to said file server in accordance with predetermined operations of said input system, and
wherein said calling system makes said call to a modem of at least one of said plurality of Internet cameras in response to said predetermined data.

7. The Internet camera system according to claim 6, wherein said terminal device includes a monitor that is capable of displaying images, which are captured by said plurality of Internet cameras, transmitted therefrom and stored in said file server,
wherein said input system includes a pointing device which is manually operable to move a pointer displayed on said monitor, said pointing device being provided with a button member,
wherein, when said pointer is located on one of predetermined images on said monitor by moving said pointing device, and then, said button member is depressed, said transmitting system transmits said predetermined data to file server in accordance with the image on which the pointer is located and said button member is depressed, and
wherein said calling system makes said call to said modem of one of said plurality of Internet cameras in response to said predetermined data.

8. The Internet camera system according to claim 6, wherein said terminal device includes a monitor that is capable of displaying images, which are captured by said plurality of Internet cameras, transmitted therefrom and stored in said file server,
wherein said input system includes a pointing device which is manually operable to move a pointer displayed on said monitor, said pointing device being provided with a button member,
wherein, when said pointer is located on a predetermined image on said monitor by moving said pointing device, and then, said button member is depressed, said transmitting system transmits said predetermined data to file server, and
wherein said calling system calls all the modems of said plurality of Internet cameras.

9. The Internet camera system according to claim 1, wherein said Internet camera transmits an image file only when said call is made by said calling system of said file server.

10. The Internet camera system according to claim 1, wherein said modem is capable of identifying a caller who is currently calling, and wherein said Internet camera transmits an image file only when the caller is a predetermined caller.

11. The Internet camera system according to claim 10, wherein said modem identifies the caller based on a telephone number transmitted through the telephone network.

12. The Internet camera system of claim 1, wherein said Internet camera stores said predetermined schedule, and updates the schedule based upon an e-mail received from said file server.

13. An Internet camera system, comprising: an Internet camera configured to connect to a packet-switched network and a circuit-switched network, to record an image as an image file, and to transmit the image file via the packet-switched network and the circuit-switched network to a file server according to a predetermined schedule, the Internet camera including a transceiver connected to the circuit-switched network, the transceiver configured to receive a connection request signal including connection information via the circuit-switched network, wherein said file server is connected to the packet-switched network and to the circuit-switched telecommunication network, the file server configured to determine whether said Internet camera is transmitting an image file to said file server, send the connection request signal to the Internet camera, via the circuit-switched network, if it is determined that said Internet camera is not transmitting an image file to said file server, and to store at least one image file, said file server interrupting the connection request signal without establishing a connection to the transceiver; and
   a terminal device connectable to the packet-switched network, said terminal device being capable of browsing images stored in said file server, wherein when the transceiver receives the connection request signal the Internet camera ignores the connection request signal received by the transceiver, waits until the connection request signal is interrupted, and transmits the image file via the packet-switched network according to the connection information when the transceiver receives the connection request signal, wherein the transceiver fails to establish a connection with respect to the connection request signal.

14. The Internet camera system according to claim 13, wherein the Internet camera answers the connection request signal on the circuit-switched network.

15. The Internet camera system according to claim 13, wherein the Internet camera transmits the image file to the file server when the connection information corresponds to the file server.

16. The Internet camera system according to claim 13, wherein the circuit-switched network includes a public telephone network, and the packet-switched network includes an Internet protocol network.

17. The internet camera system according to claim 16, wherein an Internet protocol data packet of the packet-switched network is transmitted from the Internet camera to the file server via the circuit-switched network.

18. An Internet camera system, comprising:
   a file server connected to a first telecommunication network and to a second telecommunication network;
   an Internet camera including a transceiver connected to the second telecommunication network, the Internet camera configured to record an image, to convert the image to an image file, and to transmit the image file to the file server via the first telecommunication network and the second, different, telecommunication network according to a predetermined schedule; and
   a terminal device configured to browse images stored in said file server via the first telecommunication network, and to transmit data to the file server,
   the file server further configured to determine whether said Internet camera is transmitting an image file to said file server and send a calling signal to said transceiver, via the second telecommunication network, if it is determined that said Internet camera is not transmitting an image file to said file server, the file server further configured to interrupt the calling signal without establishing a connection to the transceiver, and
   the Internet camera further configured to, when the transceiver receives the calling signal, ignore the calling signal received by the transceiver, wait until the connection with the second telecommunication network is interrupted, and record an image and transmit an image file of the recorded image, the transceiver configured to fail to establish a connection with respect to the calling signal.

19. The Internet camera system according to claim 18, wherein the first telecommunication network includes the Internet, and the second telecommunication network includes a public telephone network.

20. The Internet camera system according to claim 19, wherein an Internet protocol data packet of the first telecommunication network is transmitted via the second telecommunication network from the Internet camera to the file server.

21. The Internet camera system according to claim 18, wherein the transceiver answers the calling signal.

22. An Internet camera system, comprising:
   a file server configured to receive and store at least one image file;
   an Internet camera including a modem connected to a public telephone network, the Internet camera configured to record an image, to convert the image to an image file, and to transmit the image file to the file server via a packet-switched network and the public telephone network, according to a predetermined schedule; and
   a terminal device configured to browse images stored in said file server via the packet-switched network, and to transmit data to the file server,
   the file server further configured to determine whether said Internet camera is transmitting an image file to said file server and send a calling signal to said modem, via the public telephone network, if it is determined that said Internet camera is not transmitting an image file to said file server, said file server further configured to interrupt the calling signal without establishing a connection to the modem and
   the Internet camera further configured to, when the modem receives the calling signal, ignore the calling signal received by the modem, wait until the connection with the public telephone network is interrupted, and record an image and transmit an image file of the recorded image, the modem configured to fail to establish a connection with respect to the calling signal.

23. The Internet camera system according to claim 22, wherein the packet-switched network is in accordance with a data protocol among the group consisting of FTP, TFTP, SMTP, POP or HTTP.

* * * * *